(12) United States Patent
Karlsson et al.

(10) Patent No.: US 10,543,841 B2
(45) Date of Patent: Jan. 28, 2020

(54) VEHICLE WITH AUTONOMOUS DRIVING CAPABILITY

(71) Applicant: VOLVO TRUCK CORPORATION, Göteborg (SE)

(72) Inventors: Mikael Karlsson, Sävedalen (SE); Anders Kellström, Göteborg (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/078,708

(22) PCT Filed: Mar. 3, 2016

(86) PCT No.: PCT/EP2016/054508
§ 371 (c)(1),
(2) Date: Aug. 22, 2018

(87) PCT Pub. No.: WO2017/148516
PCT Pub. Date: Sep. 8, 2017

(65) Prior Publication Data
US 2019/0054920 A1  Feb. 21, 2019

(51) Int. Cl.
*B60W 30/165* (2012.01)
*G05D 1/00* (2006.01)
(Continued)

(52) U.S. Cl.
CPC ......... *B60W 30/165* (2013.01); *G05D 1/0088* (2013.01); *G05D 1/0295* (2013.01); *G08G 1/22* (2013.01); *H04W 4/46* (2018.02); *B60W 2050/0095* (2013.01); *B60W 2550/402* (2013.01); *G05D 2201/0213* (2013.01)

(58) Field of Classification Search
CPC ......... B60W 30/165; B60W 2550/402; B60W 2050/0095; H04W 4/46; G05D 1/0088; G05D 1/0295; G05D 2201/0213; G08G 1/22
See application file for complete search history.

(56) References Cited

U.S. PATENT DOCUMENTS 9,471,062 B1 * 10/2016 Theobald ............... G05D 1/021
2015/0177007 A1   6/2015 Su et al.
(Continued)

FOREIGN PATENT DOCUMENTS

DE   19821163 A1   11/1999
EP    2843645 A1    3/2015
(Continued)

OTHER PUBLICATIONS

International Search Report (dated Nov. 2, 2016) for corresponding International App. PCT/EP2016/054508.
(Continued)

*Primary Examiner* — Frederick M Brushaber
(74) *Attorney, Agent, or Firm* — Venable LLP; Jeffri A. Kaminski

(57) ABSTRACT

A vehicle with autonomous driving capability is adapted for at least two different driving modes including a first driving mode configured for a first type of autonomous driving and a second driving mode configured for the autonomous vehicle being guided by a pilot vehicle in such a manner that the autonomous vehicle follows the pilot vehicle.

14 Claims, 13 Drawing Sheets

(51) Int. Cl.
*H04W 4/46* (2018.01)
*G05D 1/02* (2006.01)
*G08G 1/00* (2006.01)
*B60W 50/00* (2006.01)

(56) References Cited

U.S. PATENT DOCUMENTS

2015/0217763 A1    8/2015  Reichel et al.
2015/0248131 A1    9/2015  Fairfield et al.
2016/0347327 A1*  12/2016  Kondo .................. B60W 50/14

FOREIGN PATENT DOCUMENTS

EP    2881926 A1    6/2015
EP    2915718 A1    9/2015

OTHER PUBLICATIONS

Extended European Search Report dated Oct. 29, 2019 in EP Application No. 19184616.1, 8 pages.

* cited by examiner

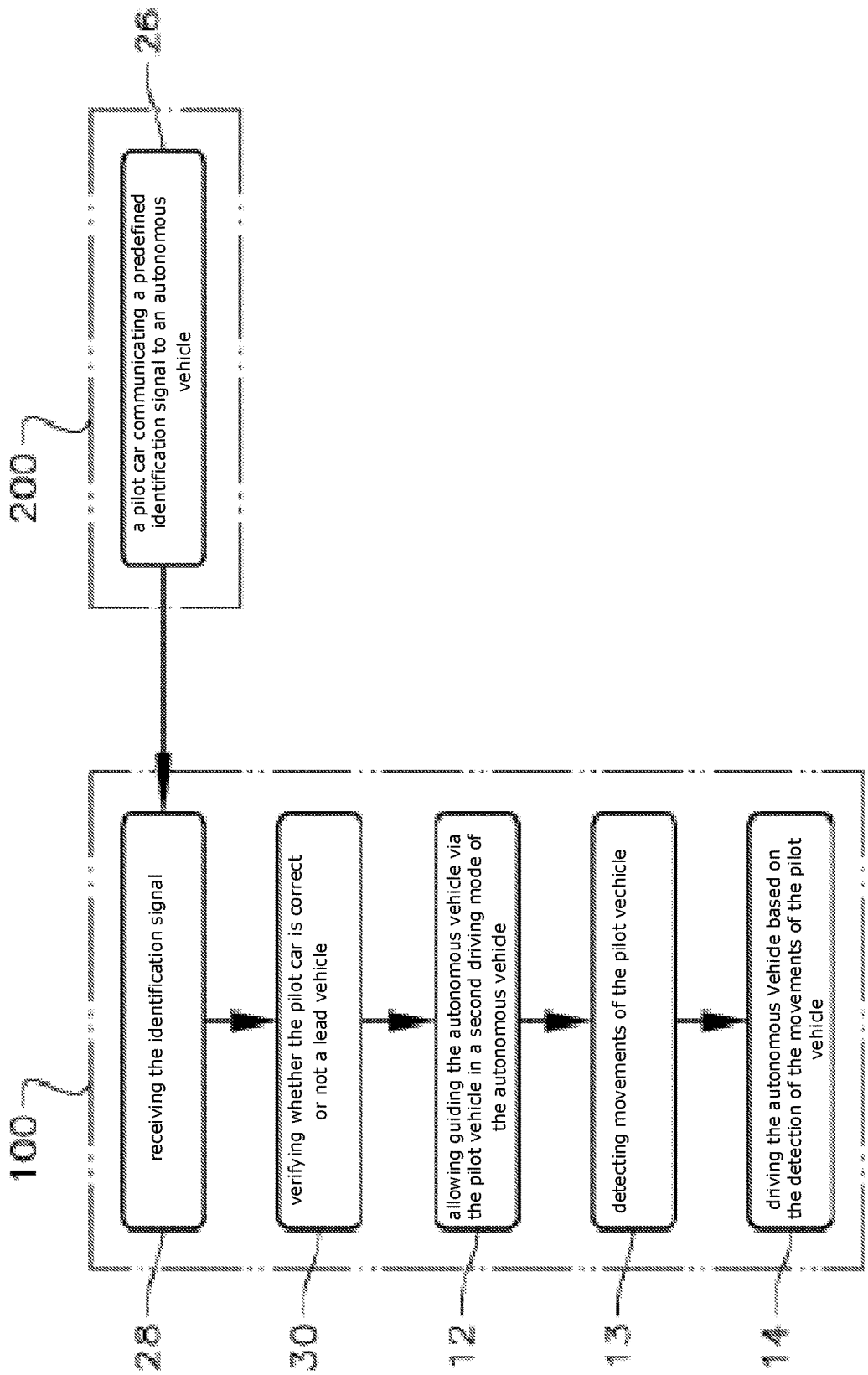

VEHICLE WITH AUTONOMOUS DRIVING CAPABILITY

BACKGROUND AND SUMMARY

The invention relates to a vehicle with autonomous driving capability. The invention is further related to a method and a computer program comprising software code means for performing the steps of the method. The invention is further related to a control unit configured for performing the steps of the method. The invention is further related to a traffic control system for controlling at least one vehicle with autonomous driving capability.

The invention can be applied in heavy-duty vehicles, such as trucks, buses and construction equipment. Although the invention will be described with respect to a truck, the invention is not restricted to this particular vehicle, but may also be used in other vehicles such as cars, buses, construction equipment such as articulated haulers and wheel loaders, boats and aircrafts.

An autonomous vehicle may be defined as a self-driving vehicle, which is one that can accelerate, brake and steer itself. Further, an autonomous vehicle may be capable of sensing its environment and navigating without human input or external control. An autonomous vehicle may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive functions such as steering, accelerating, and braking. Thus, an autonomous vehicle may reduce or eliminate the need for human interaction in various aspects of vehicle operation. A fully autonomous vehicle is able to perform all driving functions without supervision of a driver and any external control.

Reaching a level of full autonomy, of a truck is difficult and highly likely will be very costly due to a lot of redundancy in the systems of vehicle technologies and infrastructure technologies to cope with all possible traffic events in a complex traffic environment. This results in that very unlikely traffic events in the most challenging environments work as a barrier for obtaining the benefits of autonomy, which typically occur in less complex and more predictable traffic environments.

EP 2 881 926 A1 relates to a method for controlling movement of a group of road vehicles. The group of road vehicles comprises a lead vehicle and at least one additional vehicle. The lead vehicle comprises one control unit and a communication means. The at least one additional vehicle comprises a second control unit, which is adapted to in an automated mode have the movement of the at least one vehicle controlled by the control unit of the lead vehicle.

DE 198 21 163 A relates to a method for a driver assistance system which uses an assist unit which receives momentary environment parameters of a traffic situation. These are compared with stored parameters for the assist system. The system is deactivated if they lie outside generated permitted parameters and activated if inside.

It is desirable to provide a vehicle creating conditions for improving traffic security for autonomous vehicles in a cost effective way.

According to an aspect of the invention, a vehicle with autonomous driving capability is provided, wherein the autonomous vehicle is adapted for at least two different driving modes comprising a first driving mode configured for a first type of autonomous driving and a second driving mode configured for the autonomous vehicle being guided by a pilot vehicle in such a manner that the autonomous vehicle follows the pilot vehicle.

The pilot vehicle may alternatively be called a lead vehicle. In other words, the pilot vehicle may be seen as a guide for the autonomous vehicle. The autonomous vehicle may correspondingly, in the second driving mode, be called a following vehicle. According to a one example, the autonomous vehicle may follow a path that the pilot vehicle has traveled.

The "guiding" may be performed in that the autonomous vehicle first automatically identifies and approves the pilot vehicle and then follows the pilot vehicle towards a any destination determined by the pilot vehicle or a predetermined destination in the second driving mode. Thus, the autonomous vehicle may be equipped with a system for identification of the pilot vehicle.

The pilot vehicle may be a car, such as a taxi, or any other intelligently moving object such as a bicyclist. According to one example, the pilot vehicle is driven by a driver in the form of a human. According to a further example, the driver is positioned in or at the pilot vehicle and driving the pilot vehicle. According to an alternative, the pilot vehicle is an autonomous vehicle, which is capable of and allowed to drive autonomously for guiding the autonomous vehicle in its second driving mode. The pilot vehicle would in such a case be of a higher level of autonomy than the autonomous vehicle.

According to one example, the autonomous vehicle may be guided while it is positioned behind the pilot vehicle. According to one example, the autonomous vehicle is positioned directly behind the pilot vehicle in the second driving mode. Thus, the pilot vehicle is adapted to guide the autonomous vehicle while driving in front of the autonomous vehicle. The pilot vehicle and the autonomous vehicle may then be seen as a two-vehicle-convoy. By using a system for distance limitation, the distance between the pilot vehicle and the autonomous vehicle may be kept to a minimum thereby avoiding any other vehicles or moving objects to enter the space between the pilot vehicle and the autonomous vehicle.

According to a further example, by the term "guiding" is meant that the autonomous vehicle follows the pilot vehicle somehow. According to one variant, it may be realized by the autonomous vehicle being capable to wirelessly detect the movements of the pilot vehicle and drive in response to the detected movements for following a path of the pilot vehicle. Thus, in this variant, there is no requirement fir any communication between the autonomous vehicle and the pilot vehicle during driving. More specifically, the autonomous vehicle may be navigated based on the movements of the pilot vehicle. According to another variant or complement, it may be realized by the pilot vehicle sending navigation signals, such as environmental, positional and/or directional information, to the autonomous vehicle and that the autonomous vehicle drives in response to the received signals. According to still another variant, it may be realized by the pilot vehicle sending driving control signals, such as acceleration, braking and steering signals to the autonomous vehicle and that the autonomous vehicle is operated, in response to the received signals.

According to one example, the second type of autonomy is a lower level of autonomy than the first type of autonomy. The lower level may be represented by that the pilot vehicle supports in the navigation of the autonomous vehicle. Such support may be passive (by the pilot vehicle just driving in front of the autonomous vehicle without sending any signals to the autonomous vehicle) or active in sending navigation signals, such as environmental, positional and/or directional information.

According to a further example, the autonomous vehicle comprises drive functions, such as a system for steering the vehicle, a system for powering the vehicle and a system for braking the vehicle. Further, the autonomous vehicle comprises a system for sensing the environment of the vehicle (such as radar or camera). Further, the autonomous vehicle may comprise a control unit operably connected to the sensing system, the steering system, the powering system and braking system for driving the autonomous vehicle in response to the sensed environment. Further, the autonomous vehicle may comprise a system for navigating the vehicle with functions such as planning a driving route.

Hereby, the first driving mode of the autonomous vehicle may be predefined for less complex and more predictable traffic environments, such as a highway, while the second driving mode may be predefined for a more challenging traffic environment, such as a city.

According to one example, a kind of wireless "electronic towbar" arrangement may be used between the pilot vehicle and the autonomous vehicle while driving after each other (in a convoy).

According to one embodiment, the first type of autonomy comprises a fully or substantially fully autonomous driving. According to one example, by "fully" autonomous is meant that the autonomous vehicle is completely self driving. In other words, there is no driver intervention and no external control of any driving operations. Further, "substantially fully" autonomous driving may comprise that the autonomous vehicle is periodically assisted or controlled from an external source, such as a central control hub, somehow. Such an external source may comprise a human intervention or a powerful computer to handle the situation. According to one example, it may be realized in that an external source supports the driving or fully takes over the driving in certain situations, such as in a more complicated traffic situation arising in an otherwise less complex and more predictable traffic environment. The autonomous vehicle may call for assistance when such a situation is identified. Alternatively, the autonomous vehicle may be monitored and the external source supports automatically when such a situation is identified.

According to a further embodiment, the first type of autonomy is adapted for autonomously driving the vehicle towards a destination in response to received driving instructions regarding a route or destination. Thus, it is in contrast to the second driving mode, which is represented by following the pilot vehicle along a route or to a destination. Especially, there is no requirement in the second driving mode for the autonomous vehicle to have information about a route or destination.

According to a further embodiment, the first type of autonomy is adapted for autonomously driving the vehicle towards a destination without any pilot vehicle guidance. According to one example, the first type of autonomy is adapted for navigating the autonomous vehicle towards a destination without any pilot vehicle guidance.

According to a further embodiment, the first driving mode is associated to a first geographic region defined as secured for the first type of autonomy, wherein the autonomous vehicle is allowed to be driven in the first type of autonomy in the first geographic region. According to one example, said first geographic region (traffic area) is a predetermined area with a comparatively non-complicated (easy) driving situation, such as a road, stretch with no opposite traffic, few or no intersections, few or no pedestrians and bikes etc., such as a part of a highway.

According to one example, the autonomous vehicle has the capacity to drive autonomously in the first geographic region.

According to a further embodiment, the second driving mode is associated to a second geographic region defined as not secured for the first type of autonomy, wherein the autonomous vehicle is not allowed to be driven in the first type of autonomy in the second geographic region. According to one example, the second geographic region (traffic area) may be a predetermined area with a comparatively complicated (difficult) driving situation, such as a village or town with many intersections, roundabouts, traffic lights, traffic signs and moving objects, such as pedestrians and bikes etc. According to another example, the second geographic region is defined by a region between highways.

According to one example, the autonomous vehicle does not have, the capacity to drive in the second geographic region but the pilot vehicle has the capacity to drive in the second geographic region. For example, the pilot vehicle may be a more advanced autonomous vehicle or it may have a driver.

According to one example, the first and second, geographic regions are defined on a digital map. Thus, a navigation system of the autonomous vehicle may comprise the digital map. The position of the autonomous vehicle with regard to the first and second geographic regions may be determined via GPS. According to one example, a specific pilot vehicle is identified for being associated to and guiding a certain autonomous vehicle that approaches a check-out point of the first geographic region and/or a check-in point to the second geographic region. A signal may be generated automatically and sent to the identified pilot vehicle with a request for guiding the autonomous vehicle from said "check-out point of the first geographic region or a check-in point to the second geographic region to a predetermined destination.

According to a further embodiment, the second driving mode is configured for a second type of autonomy, which comprises an autonomous following of the pilot vehicle. According to one example, the second type of autonomy does not require any input of control signals from the pilot vehicle. Thus, in this embodiment, the autonomous vehicle is self-driving in the second driving mode.

According to a further development of the last-mentioned embodiment, the autonomous vehicle comprises means for detecting a movement of the pilot vehicle and corresponding to the detected movement driving the autonomous vehicle behind the pilot vehicle. The autonomous vehicle is driven in response to the detected movements.

According to a still further development of the last-mentioned embodiment, the autonomous vehicle comprises means for detecting an orientation or direction of the pilot vehicle and/or a distance between the autonomous vehicle and the pilot vehicle. The autonomous vehicle is driven in response to the detected information.

According to one example, the follower (the autonomous vehicle) reads the distance and orientation of the lead vehicle (the pilot vehicle) with frequent sampling. The sample information can then be gathered and then describe the path the lead vehicle has followed. The follower can then drive the same path with a defined gap or headway.

According to a further embodiment, the second driving mode is configured for a non-autonomous driving mode.

Thus, in this embodiment, the autonomous vehicle is not fully self-driving in the second driving mode. According to one example, the autonomous vehicle is driven based on control signals from the pilot vehicle in the second driving mode. According to one alternative, the pilot vehicle sends navigational information to the autonomous vehicle.

According to one example, the lead vehicle can communicate its position to the follower in a known coordinate system. The follower can then follow in the lead vehicles "virtual tracks", also called snail trail. The more vehicle data, e.g. heading and time, the lead vehicle reports the better the following performance. The same approach can be used when the follower is using its own sensors to measure its relative or absolute positioning to the lead vehicle.

According to a further example, the lead vehicle can communicate references and its positioning towards the references. For example can the lead vehicle communicate the lateral distance it has to a lane marking and the follower can position itself likewise and follow the lead vehicle with as onboard sensor e.g. radar. If references are used for triangulation also longitudinal distance to the leader can be estimated in the same manner.

According to a further example, the lead vehicle can communicate a path (snail trail) in a known coordinate system which the follower can follow either depending on communicated time at each positions on the path or by measured distance to the vehicle ahead.

According to another alternative or complement, the pilot vehicle sends driving signals, such as acceleration, braking and steering signals, to the autonomous vehicle. According to one example, the autonomous vehicle is driven from the pilot vehicle in the second driving mode of the autonomous vehicle. Certain systems, such as safety related systems of the autonomous vehicle may however still be operated by the autonomous vehicle while the steering, powering and braking of the autonomous vehicle is performed or at least initiated by the pilot vehicle. According to one example, the term "driving the autonomous vehicle" comprises an at least partly drive of the autonomous vehicle. In other words, "driving the autonomous vehicle" may comprise steering the autonomous vehicle and/or powering (accelerating/decelerating) the autonomous vehicle, etc. Thus, at least part of the controlling or driving of the autonomous vehicle may be taken over by the pilot vehicle from the autonomous vehicle.

According to a further example, the autonomous vehicle is driven based on driving control signals from a control unit in the pilot vehicle in the second driving mode According to one example, a control unit in the autonomous vehicle is adapted to receive the driving control signals from the control unit of the pilot vehicle and in response thereto send driving control signals to different drive systems of the autonomous vehicle. According to an alternative, the control unit of the pilot vehicle directly controls the different drive systems of the autonomous vehicle.

According to a further embodiment, the second driving mode is configured for driving the autonomous vehicle based on navigation and/or driving control signals generated by a control unit in the pilot vehicle.

According to a further embodiment, the first driving mode is configured tier driving the autonomous vehicle based on navigation and/or driving control signals generated by a control unit in the autonomous vehicle.

According to a further embodiment, the autonomous vehicle comprises means for verifying that a vehicle has the capacity for being the pilot vehicle. Thus, a verification process may be performed before any piloting/guiding is initiated.

According to a farther embodiment, the autonomous vehicle is a goods or material transporting vehicle. According to one example, the autonomous vehicle is a truck. According to one embodiment, the pilot vehicle is a car. According to one example, the car is associated to a taxi operation. The taxi operation may be operated via the internet.

According to a further aspect of the invention, it regards a method for driving a vehicle with autonomous driving capability according to any one of the preceding embodiments and examples, characterized by the step of allowing guiding of the autonomous vehicle via the pilot vehicle in the second driving mode.

According to one embodiment, the method comprises the step of detecting a movement of the pilot vehicle and the step of driving the autonomous vehicle in response to the detected movement of the pilot vehicle in the second driving mode.

According to a further embodiment, the method comprises the step of receiving navigation and/or driving control signals from the pilot vehicle and the step of driving the autonomous vehicle in response to the received signals in the second driving mode. According to one alternative, the method comprises the step of receiving navigation and/or driving control signals for the autonomous vehicle from the pilot vehicle simultaneously with the pilot vehicle being driven.

According to a further alternative, the method comprises the step of receiving navigation and/or driving control signals for the autonomous vehicle based on driving manoeuvers performed by a driver of the pilot vehicle.

According to one example, the method comprises the step of receiving driving control signals for the autonomous vehicle based on driving maneuvers performed by a driver of the pilot vehicle. According to one realization of this example, the driver of the pilot vehicle has information regarding the driving characteristics of the autonomous vehicle, such as steering, accelerating, decelerating etc, and drives the pilot vehicle accordingly so that the autonomous vehicle can follow, wherein the driving manoeuvres performed by the driver of the pilot vehicle are used also for driving the autonomous vehicle.

According to a further alternative, the method comprises the step of modifying the navigation and/or driving control signals received from the pilot vehicle and outputting driving control signals modified accordingly for driving the autonomous vehicle. Thus, according to this example, the control unit of the autonomous vehicle performs the modifications of the received control signals.

According, to a further embodiment, the method comprises the step of verifying that a vehicle has the capacity of being the pilot vehicle. Thus, the verification procedure is adapted to secure that the pilot vehicle requesting control is approved.

According to one alternative, the method comprises the step of detecting a pattern of the pilot vehicle, comparing the detected pattern with a predetermined pattern and confirming the pilot vehicle if the detected pattern corresponds to the predetermined pattern.

The first step in autonomous vehicle following is to identify the leader. It is crucial to follow the right leader. The identification can be made in different manner where communication can be insufficient if the origin of the communication is unknown. Identification can be made e.g. by that the leader is communicating a paten or similar (signals or movements) that can be pickup by the autonomous follower e.g. flashing a light and communicating or predefine how the flashing pattern should look like. If the wrong leader is picked can functional safety be jeopardized.

According to a further alternative, the method comprises the step of receiving an identification signal from the pilot vehicle, comparing the received identification signal with a predetermined signal and confirming the pilot vehicle if the detected signal corresponds to the predetermined signal.

According to a further alternative, the method comprises the step of sending a signal to the pilot vehicle with information regarding a starting point where the pilot vehicle should initiate driving of the autonomous vehicle. The starting point may be a point of entry to a second geographic region defined as "not secured for the first type of autonomy". Alternatively, the starting point may be a goods receiving or delivery point, a service workshop etc. According to a further alternative, the method comprises the step of sending a signal to the pilot vehicle with information regarding a time when the pilot vehicle should initiate driving of the autonomous vehicle.

According to a further alternative, the method comprises the step of sending a signal to the pilot vehicle with information regarding a destination for the autonomous vehicle. The destination may be a point of entry to a first geographic region defined as "secured to the first type of autonomy". Alternatively, the destination may be a goods receiving or delivery point, a service workshop etc.

According to a further alternative, the method comprises the step of sending a signal to the pilot vehicle with information regarding driving characteristics of the autonomous vehicle, which may be certain characteristics associated to the type or model of the autonomous vehicle and/or payload. Such driving characteristics of the autonomous vehicle may be used by the pilot vehicle for planting and executing the guiding of the autonomous vehicle.

According to a further aspect of the invention, it regards a computer program comprising software code means for performing the steps of any of the method embodiments and examples above when said program is run on a computer.

According to a further aspect of the invention, it regards a control unit for a vehicle with autonomous driving capability characterized in that the control unit comprises software code means configured to perform the step(s) according to any one of the method embodiments and examples above.

According to a further aspect of the invention, it regards a traffic control system comprising at least one vehicle with autonomous driving capability, wherein the autonomous vehicle is adapted for at least two different driving modes comprising a first driving mode configured for a first type of autonomous driving and a second driving mode configured for the autonomous vehicle being guided by a pilot vehicle in such a manner that the autonomous vehicle follows the pilot vehicle, at least one pilot vehicle, a control means having a software code defining a first geographic region defined as secured for the first type of autonomy, wherein the autonomous vehicle is allowed to be driven in the first type of autonomy in the first geographic region, and a second geographic region defined as not secured for the first type of autonomy, wherein the autonomous vehicle is not allowed to be driven in the first type of autonomy in the second geographic region, wherein the pilot vehicle has the capacity to drive in the second geographic region and is allowed to guide the autonomous vehicle in the second geographic region.

According to one example, the control means is provided in a distant control unit/hub/center. According to an alternative or complement, the control means is at least partially provided in at least one of the autonomous vehicle and the pilot vehicle.

According to one embodiment, the control means is adapted to call for a pilot vehicle when the autonomous vehicle is in the first geographic region and approaches the second geographic region.

According to a further development of the last-mentioned embodiment, the call comprises information regarding at least one of a starting point Where the pilot vehicle should initiate guiding of the autonomous vehicle, a time when the pilot vehicle should initiate guiding of the autonomous vehicle and a destination for the autonomous vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
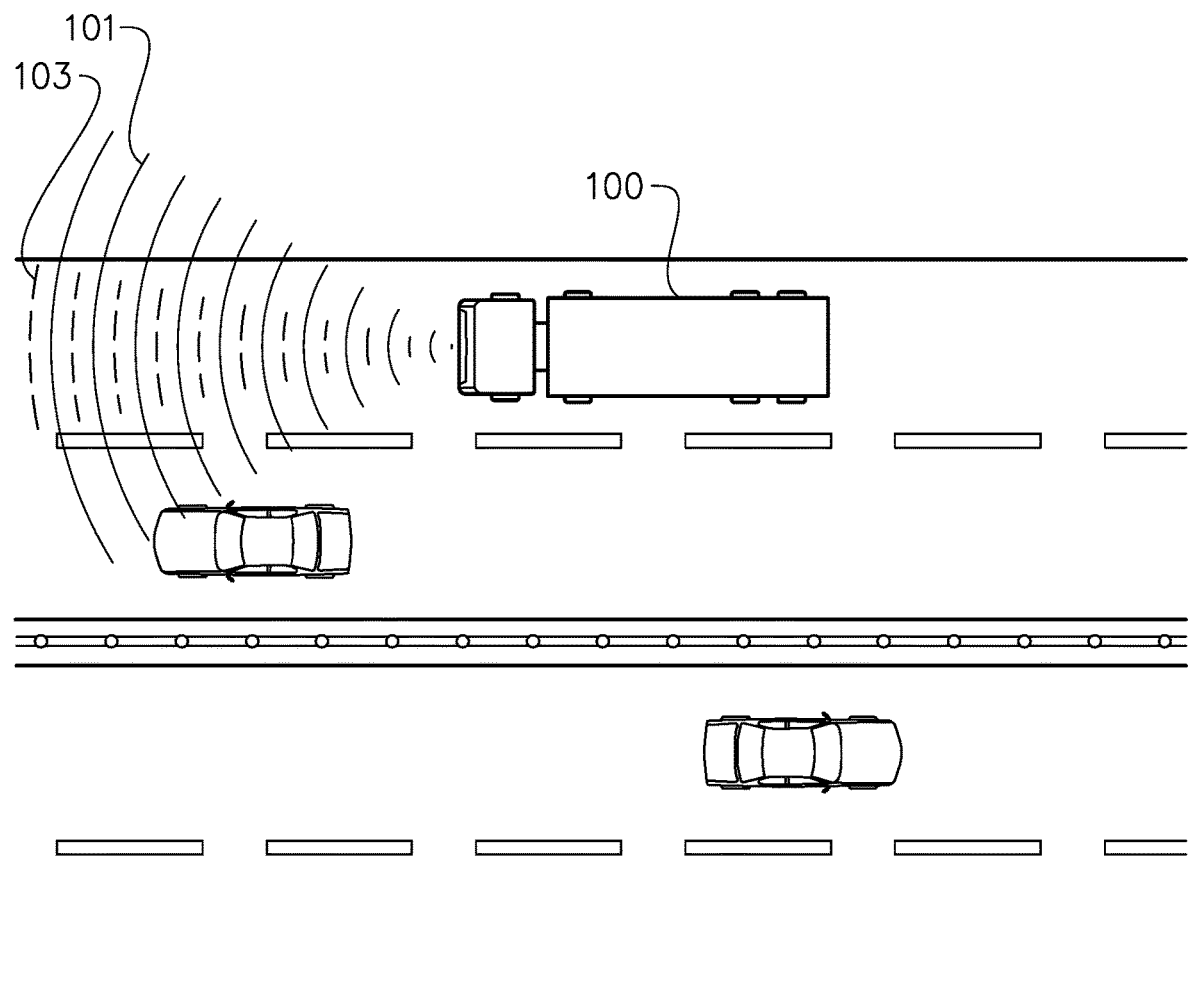
FIG. 1 is a view from above of an autonomous truck on a highway.

FIG. 1 is a schematic view from above of a vehicle with autonomous driving capability 100 according to a first embodiment in operation on a highway. The autonomous vehicle 100 is armed by a cargo moving vehicle, and more specifically by a truck. The autonomous vehicle 100 will in the following, for ease of presentation, be referred to as an autonomous truck 100.

The autonomous truck 100 is adapted for at least two different driving modes comprising a first driving mode configured for a first type of autonomous driving and a second driving mode configured for the autonomous truck being guided by a pilot vehicle 200, see FIGS. 2a and 2b (which will be described in more detail below), in such a manner that the autonomous truck 100 follows the pilot vehicle. The first type of autonomy comprises a fully or substantially fully autonomous driving. The first type of autonomy is adapted for autonomously driving the truck 100 towards a destination in response to received driving instructions regarding a route or destination. The first type of autonomy is adapted for autonomously driving the truck 100 towards a destination without any pilot vehicle guidance.

Figure 3:
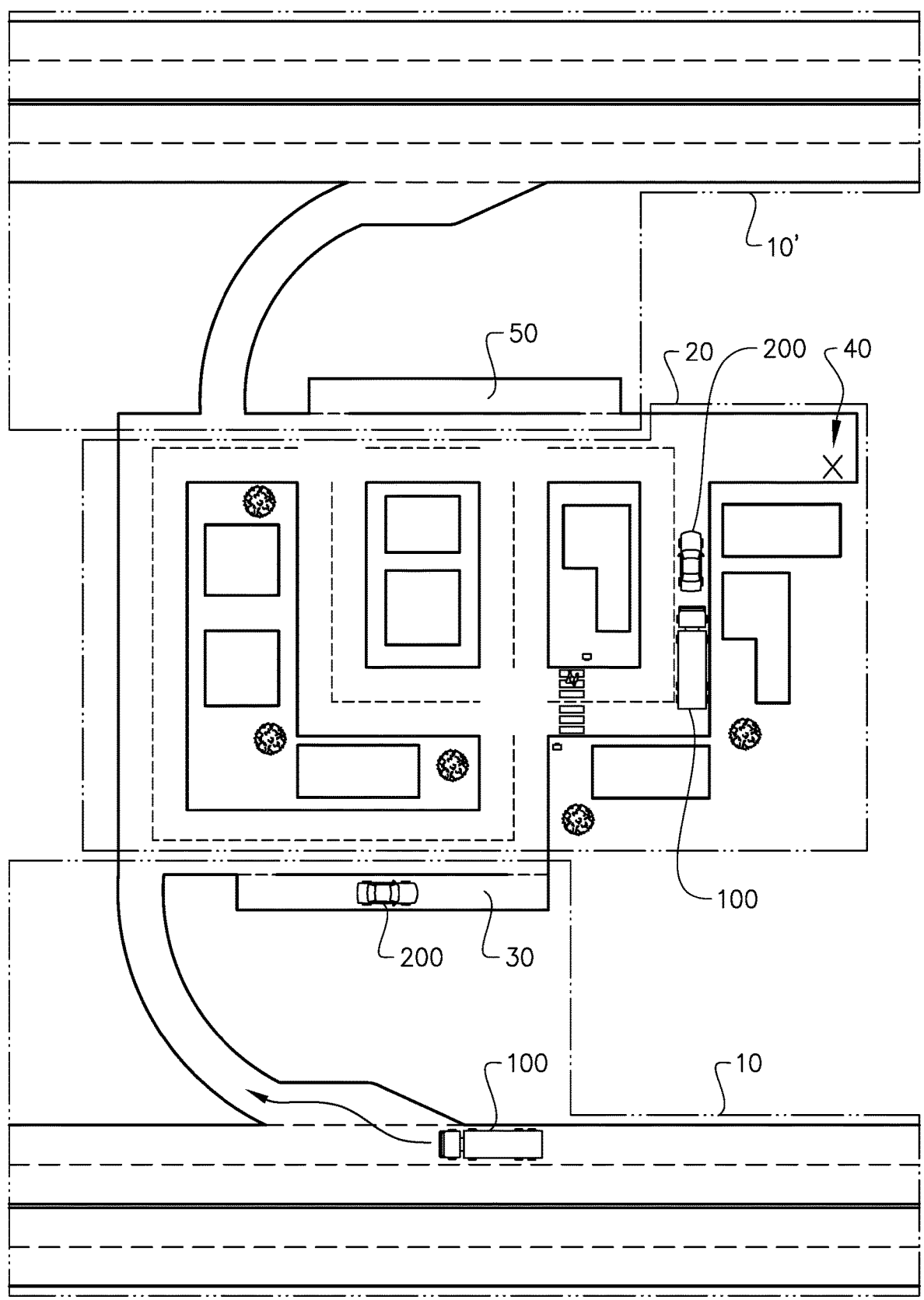
FIG. 3 is a schematic view of the autonomous truck and the pilot car in different geographic regions defined as "secured for autonomy" and "not secured for autonomy"

The first driving mode is associated to a first geographic region 10, 10' defined as secured for the first type of autonomy, see FIG. 3, wherein the autonomous truck 100 is allowed to be driven in the first type of autonomy in the first geographic region. The second driving mode is associated to a second geographic region 20 defined as not secured for the first type of autonomy, wherein the autonomous truck 100 is not allowed to be driven in the first type of autonomy in the second geographic region.

The autonomous truck 100 is in FIG. 1 in the first driving mode in which it is controlled by a control unit (which will be described in more detail below) in the autonomous truck 100. The autonomous truck 100 comprises a system for sensing the environment, which may comprise a short-range radar in a forward-facing arc 101, and a longer-range unit that scans in a much smaller forward-facing arc 103. The autonomous truck 100 is, according to the first embodiment, adapted be operated without a human at all in the first driving mode. Alternatively, the autonomous truck 100 may be adapted to be operated with limited human intervention in the first driving mode.

Figure 2A:
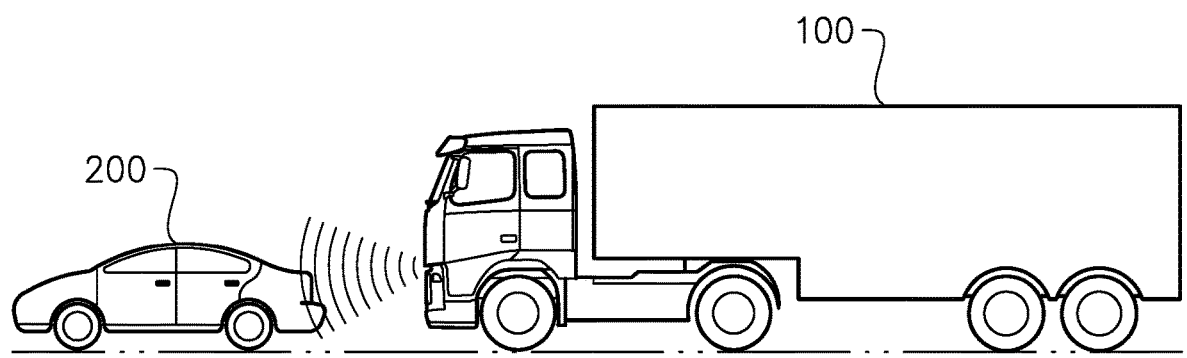
FIG. 2a is a side view of the autonomous truck guided by a pilot car.

FIG. 2a is a side view of the autonomous truck 100 in a first variant of the second driving mode, in which it is guided by the pilot car 200. The second driving mode is configured for a second type of autonomy, which comprises an autonomous following of the pilot car 200. The autonomous truck 100 comprises means for detecting a movement of the pilot car (such as the radar and/or camera) and corresponding to the detected movement drive the autonomous truck 100 behind the pilot car 200. More specifically, said detection means is adapted for detecting an orientation or direction of the pilot car and/or a distance between the autonomous truck 100 and the pilot car 200. In the first variant, the pilot car 100 passively guides the autonomous truck 200 in that it drives towards a destination while the autonomous truck 100 is adapted for following a path of the pilot car 200.

The pilot cat 200 is formed by a passenger car and will in the following, for ease of presentation, be referred to as a pilot car 200. The pilot car 200 is, according to the first embodiment, adapted be operated by a human driver in the pilot car. Alternatively, the pilot car 200 may be adapted to be operated without a human driver in the pilot car. According to a further example, the pilot car 200 may be adapted to be operated autonomously or semi-autonomously.

Figure 2B:
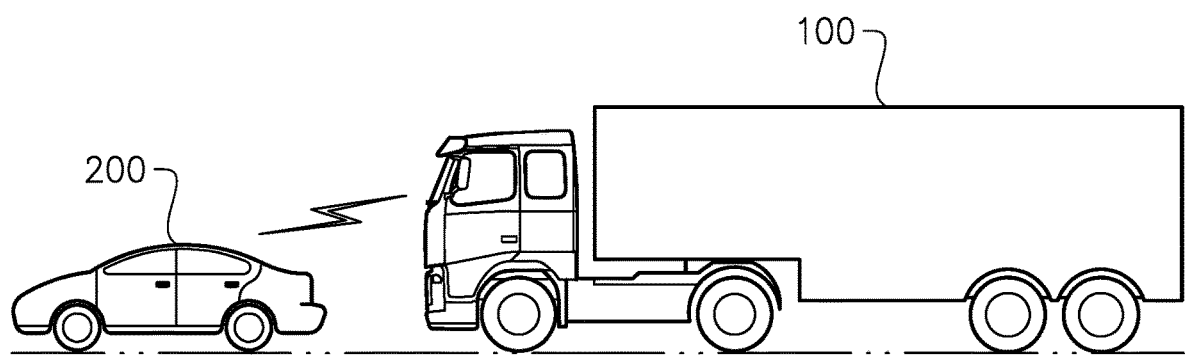
FIG. 2b is a side view of the autonomous truck guided and controlled by a pilot car.

FIG. 2b is a side view of the autonomous truck 100 in a second variant of the second driving mode, in which the autonomous truck 100 is actively guided and/or controlled by a control unit in a pilot vehicle 200. More specifically, the autonomous truck 100 and the pilot vehicle 200 are adapted for a wireless connection for transferring signals between them.

FIG. 3 is a schematic view of two first geographic regions 10,10' defined as "secured for a first type of autonomy" and a second geographic region 20 defined as "not secured for the first type of autonomy".

The first geographic region (traffic area) 10,10' is a predetermined area with a comparatively non-complicated (easy) driving situation, such as a road stretch with no opposite traffic, few or no intersections, few or no pedestrians and bikes etc, and is exemplified as a part of a highway. The first, autonomous, driving mode is associated to the first geographic region 10,10' defined as "secured for the first type of autonomy", wherein the autonomous truck 100 is allowed to be driven autonomously in the first geographic region.

The second geographic region (traffic area) 20 is a predetermined area comprising a region with a comparatively complicated (difficult) driving situation, such as a village or town with many intersections, roundabouts, traffic lights and signs and moving objects, such as pedestrians and bikes etc. According to the shown example, the second geographic region is defined by a region between highways. The second driving mode is associated to the second geographic region 20 defined as "not secured for the first type of autonomy", wherein the autonomous truck 100 is not allowed to be driven in the first type of autonomy in the second geographic region. Instead, the autonomous truck 100 is allowed to be guided by the pilot car 200 in the second geographic region.

According to the example shown, the autonomous truck 100 travels in consecutive order from a first one of the first geographic regions 10 to the second geographic region 20 and then to a second one of the first geographic regions 10'. A check-in point 30 is provided in the interface between the first geographic region 10 and the second geographic region 20. A destination 40 is indicated within the second geographic region 20. A cheek-out point 50 is provided in the interface between the second geographic region 20 and the second one of the first geographic regions 10'.

According to the example shown, the check-in point 30 is provided in the first one of the first geographic regions 10 and the check-out point 50 is provided in the second one of the first geographic regions 10'. Each one of the check-in point 30 and the check-out point 50 is formed by an area beside a by-road connected to the highway, which is sufficient length for housing at least the pilot car 200, preferably for housing at least the autonomous vehicle 100 and more preferably for housing at least one, pair of pilot car 200 and autonomous vehicle 100 positioned after each other in the driving direction so that a verification procedure may be performed while both vehicles are in a standstill state.

Figure 4A:
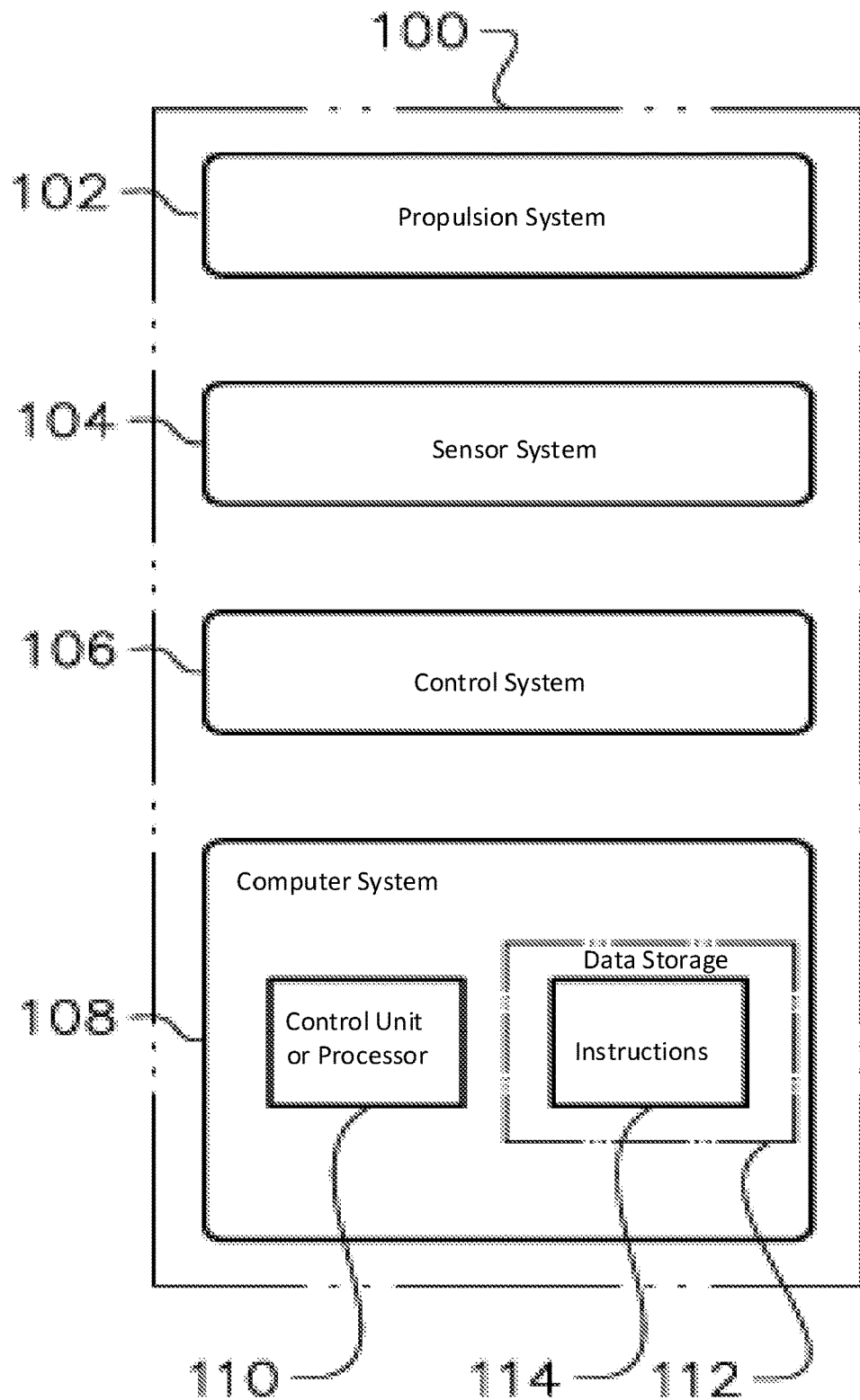
FIG. 4a is a block diagram of different units in the autonomous truck according to a first embodiment.

FIG. 4a is a block diagram of different units in the autonomous truck 100 according to a first embodiment. The autonomous truck 100 comprises various subsystems such as a propulsion system 102, a sensor system 104, a control system 106 and a computer system 108. Further, each of the subsystems may be interconnected. Thus, one or more of the described subsystems of the vehicle 100 may be divided up into additional functional or physical components, or combined into fewer functional or physical components.

The propulsion system 102 may include components operable to provide powered motion for the autonomous truck 100. The propulsion system 102 comprises an engine/motor, an energy source, a transmission and wheels/tires. The engine/motor may be formed by an internal combustion engine, an electric motor, or a combination thereof. According to this example, the engine is a diesel engine.

The energy source may be a source of energy that may, in full or in part, power the engine/motor. Examples of energy sources contemplated within the scope of the present disclosure include gasoline, diesel, other petroleum-based fuels, propane, other compressed gas based fuels, ethanol, solar panels, batteries, and other sources of electrical power. The energy source(s) could additionally or alternatively include any combination of fuel tanks, batteries, capacitors, and/or flywheels. The energy source could also provide energy for other systems of the autonomous truck 100.

The transmission comprises elements that are operable to transmit mechanical power from the engine/motor to the wheels/tires. The transmission comprises a gearbox, a clutch, a differential, and a drive shaft. Other components of transmission are possible. The drive shafts could include one or more axles that could be coupled to the one or more wheels/tires.

The sensor system 104 may comprise several elements such as a Global Positioning System (GPS), a radar (and as an alternative or complement a laser rangefinder/LIDAR and a camera), a steering sensor, and a throttle/brake sensor. The GPS comprises a transceiver operable to provide information regarding the position of the autonomous truck 100 with respect to the Earth. The radar may represent a system that utilizes radio signals to sense objects, and in some cases their speed and heading, within the local environment of the truck 100. Additionally, the radar may have a plurality of antennas configured to transmit and receive radio signals. The steering sensor comprises a system that senses the steering angle of the truck 100.

The throttle/brake sensor comprises a system that senses the position of either the throttle position or brake position of the vehicle 100. In some embodiments, separate sensors may measure the throttle position and brake position. In some embodiments, the throttle/brake sensor may measure the angle of both the gas pedal (throttle) and brake pedal.

The control system 106 may comprise various elements including a steering unit, throttle, brake unit, a sensor fusion algorithm, a computer vision system, a navigation/pathing system, and an obstacle avoidance system. The steering unit could represent any combination of mechanisms that may be operable to adjust the heading of vehicle 100. The throttle could control, for instance, the operating speed of the engine/motor and thus control the speed of the vehicle 100. The brake unit could be operable to decelerate the vehicle 100.

The navigation/pathing system could be configured to determine a driving path for the truck 100. The navigation/pathing system may additionally update the driving path dynamically while the truck 100 is in operation. In some embodiments, the navigation/pathing system could incorporate data from the GPS, and known maps so as to determine the driving path for truck 100.

The obstacle avoidance system could represent a control system configured to evaluate potential obstacles based on sensor data and control the vehicle 100 to avoid or otherwise negotiate the potential obstacles.

Further, the control system 106 comprises a wireless communication system providing means for the truck 100 to communicate with devices within its environment. The wireless communication system is configured to wirelessly communicate with one or more devices directly or via a communication network. For example, wireless communication system could use 3G cellular communication, such as CDMA, EVDO, GSM/GPRS, or 4G cellular communication, such as WiMAX or LTE. Alternatively, wireless communication system could communicate with a wireless local area network (WLAN), for example, using WiFi. In some embodiments, wireless communication system could communicate directly with a device, for example, using an infrared link, Bluetooth, or ZigBee. Other wireless protocols, such as various vehicular communication systems, are possible within the context of the disclosure. For example, the wireless communication system could include one or more dedicated short range communications (DSRC) devices that could include public and/or private data communications between vehicles.

The power supply may provide power to various components of the truck 100 and could represent, for example, a rechargeable lithium-ion or lead-acid battery.

Many or all of the functions of the truck 100 are controlled by computer system 108. Computer system 108 may include at least one control unit or processor 110 (which could include at least one microprocessor) that executes instructions 114 stored in a non-transitory computer readable medium, such as the data storage 112. The computer system 108 may also represent a plurality of computing devices that may serve to control individual components or subsystems of the vehicle 100 in a distributed fashion. In some embodiments, data storage 112 may contain instructions (e.g., program logic) executable by the processor 110 to execute various functions of vehicle 100. Data storage may contain additional instructions as well, including instructions to transmit data to, receive data from, interact with, and/or control one or more of the propulsion system 102, the sensor system 104 and the control system 106. In addition to the instructions, the data storage 114 may store data such as roadway maps, path information, among other information. Such information may be used by the truck 100 and computer system 108 during the operation of the truck 100 in the autonomous, semi-autonomous (and/or manual modes).

The computer system 108 may control the function of the vehicle 100 based on inputs received from various subsystems (e.g., propulsion system 102, sensor system 104, and control system 106). For example, the computer system 108 may utilize input from the sensor system 104 in order to estimate the output produced by the propulsion system 102 and the control system 106. Depending upon the embodiment, the computer system 108 could be operable to monitor many aspects of the vehicle 100 and its subsystems. In some embodiments, the computer system 108 may disable some or all functions of the vehicle 100 based on signals received from sensor system 104.

The components of the vehicle 100 could be configured to work in an interconnected fashion with other components within or outside their respective systems. For instance, in an example embodiment, the camera could capture a plurality of images that could represent information about a state of an environment of the vehicle 100 operating in an autonomous mode. The state of the environment could include parameters of the road on which the vehicle is operating. For example, the computer vision system may be able to recognize the slope (grade) or other features based on the plurality of images of a roadway. Additionally, the combination of Global Positioning System and the features recognized by the computer vision system may be used with map data stored in the data storage to determine specific road parameters. Further, the radar unit may also provide information about the surroundings of the vehicle.

In other words, a combination of various sensors (which could be termed input-indication and output-indication sensors) and the computer system 108 could interact to provide an indication of an input provided to control the truck 100 or an indication of the surroundings of the truck 100. In some embodiments, the computer system 108 may make a determination about various objects based on data that is provided by systems other than the radio system. For example, the truck 100 may have lasers or other optical sensors configured to sense objects in a field of view of the vehicle. The computer system may use the outputs from the various sensors to determine information about objects in a field of view of the vehicle. The computer system may determine distance and direction information to the various objects. The computer system may also determine whether objects are desirable or undesirable based on the outputs from the various sensors.

The wireless communication system may include wireless transmitters and receivers that could be configured to communicate with devices external or internal to the pilot car 200.

Figure 4B:
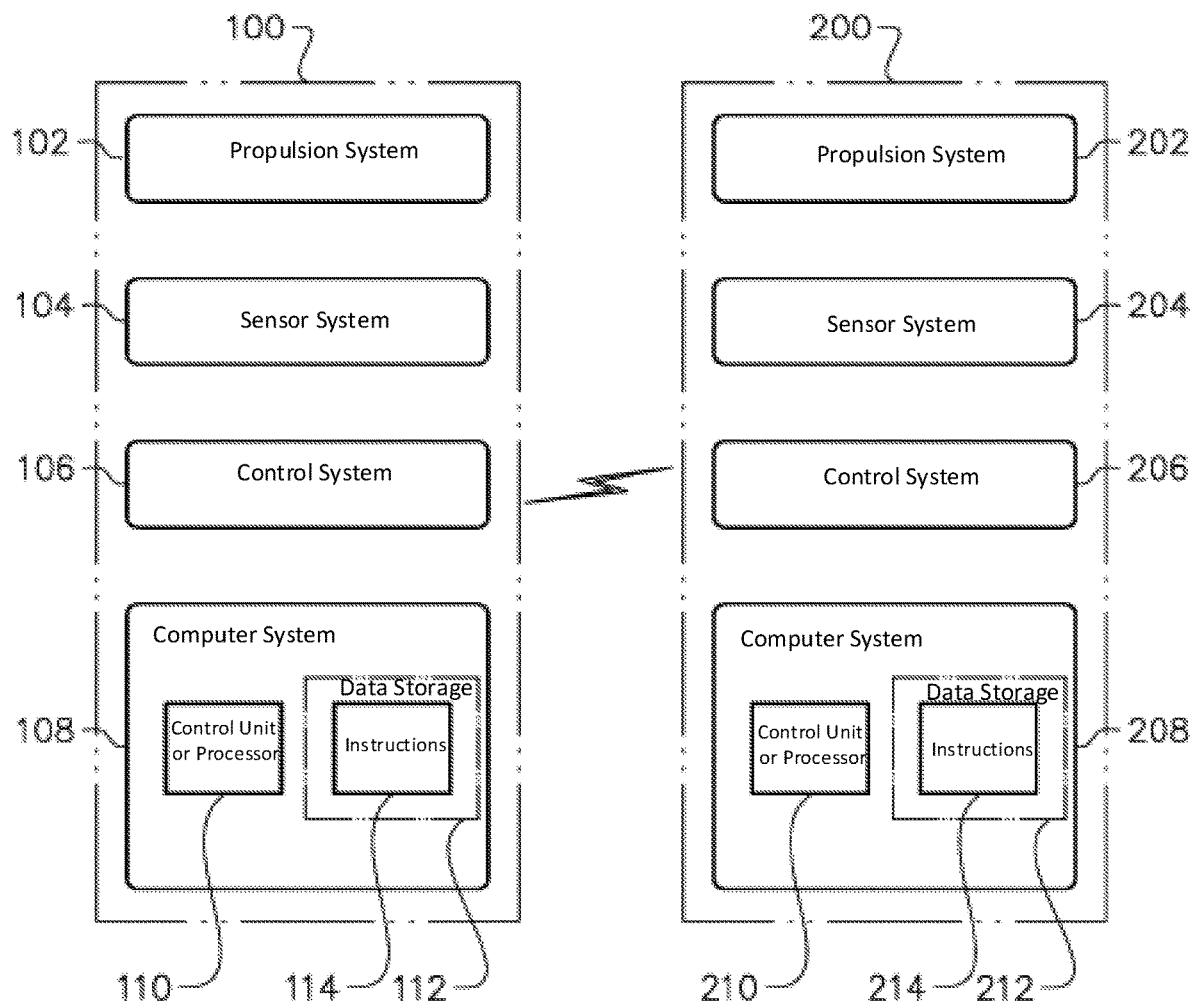
FIG. 4b is a block diagram of different units in the autonomous truck according to a second embodiment and the pilot car.

FIG. 4b is a block diagram of different units in the autonomous truck 100 and the pilot car 200 according to an example embodiment. Especially, the control system 106 is adapted to communicate with the pilot car 200. According to the second embodiment, the pilot car 200 is provided with similar systems as has been described above for the autonomous truck 100, such as a propulsion system 202, a sensor system 204, a control system 206 and a computer system 208. For ease of presentation, the similar systems of the pilot car 200 will not be further described here.

Figure 5A:
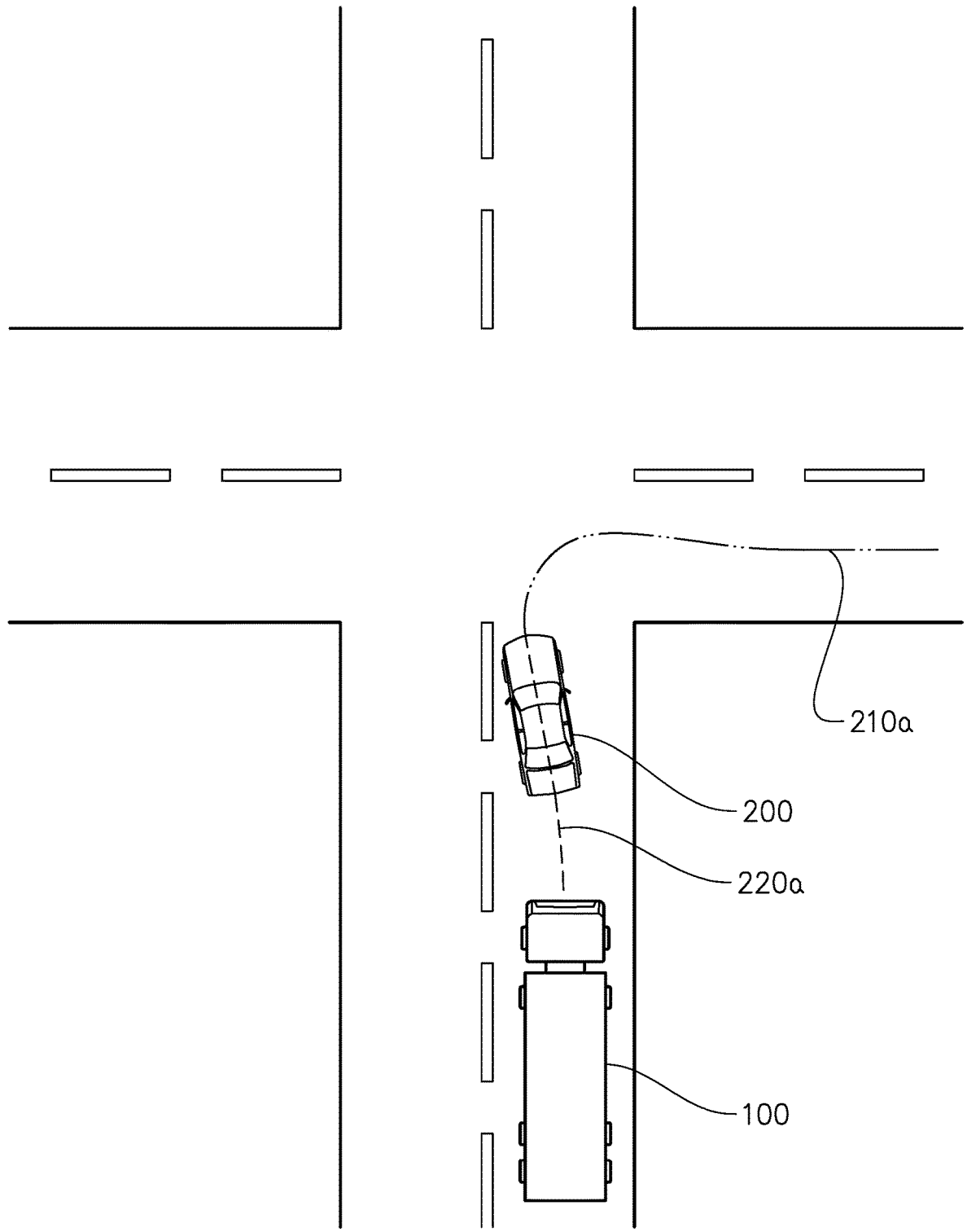
FIG. 5a is a schematic view of the autonomous truck according to FIG. 4a guided by the pilot car in an intersection.

FIG. 5a is a schematic view of the autonomous truck according to FIG. 4a guided by the pilot car in an intersection. According to this example, the pilot car is driven in a way corresponding to driving of the autonomous truck. Regarding cornering, the pilot car is steered along a path 220a around the corner corresponding to a turning radius of the autonomous truck. Thus, the pilot car 200 takes a longer route around the corner than necessary tier the pilot car itself. Thus, the autonomous truck 100 follows a path 220a commensurate with the path 210a of the pilot car 200. Further, due to the fact that a track requires a longer acceleration and deceleration distance than a car, preferably, the pilot car may also be driven in a corresponding way. Thus, in the case the pilot car has a human driver, he must have the knowledge of the driving characteristics of the truck. Alternatively, in the case the pilot car is an autonomous vehicle, it should be adapted according to the driving characteristics of the truck.

Figure 5B:
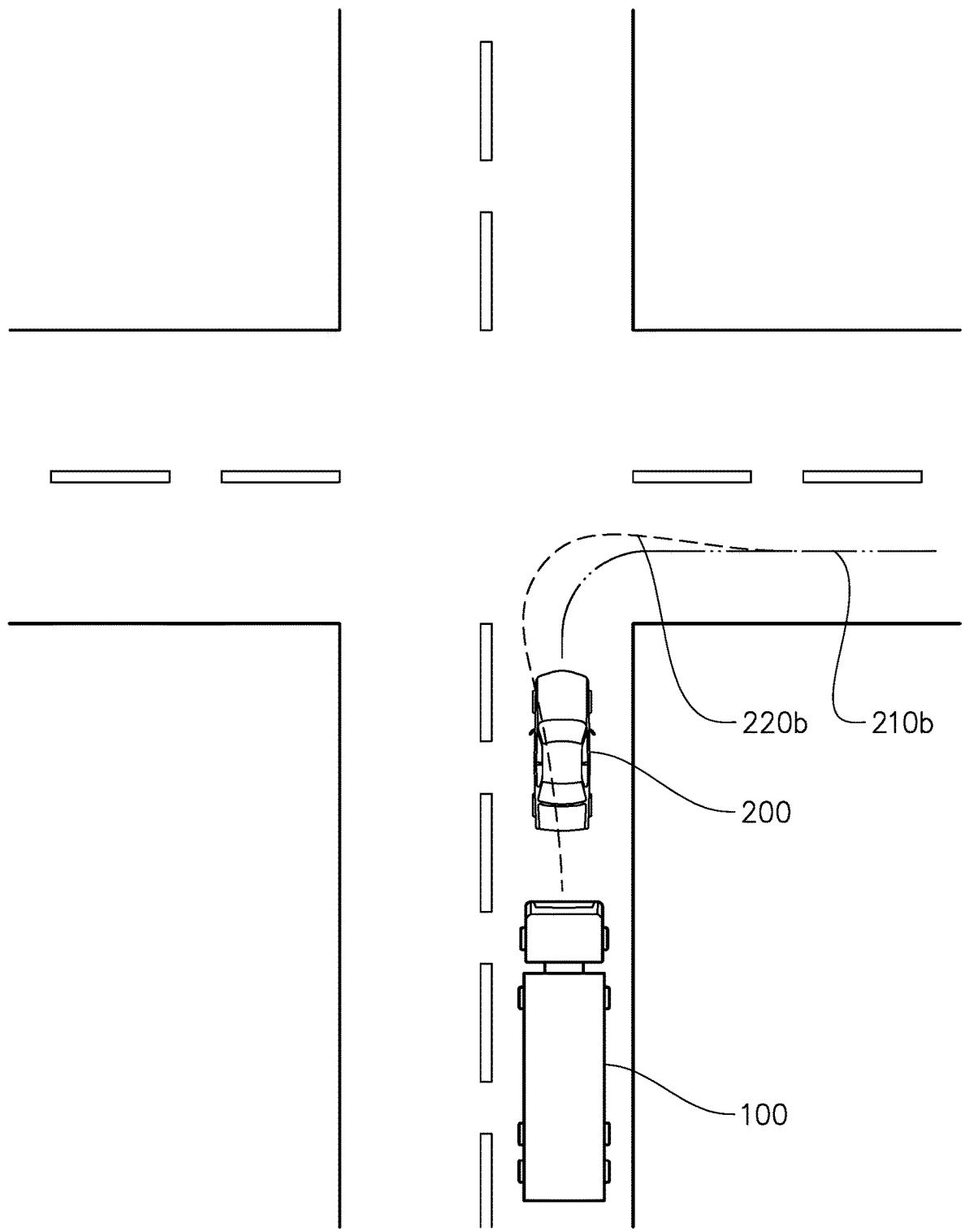
FIG. 5b is a schematic view of the autonomous truck according to FIG. 4b guided by the pilot car in an intersection.

FIG. 5b is a schematic view of the autonomous truck according to FIG. 4b guided by the pilot car in an intersection. In this case, the pilot vehicle is driven according, to its normal operation, at least with regard to cornering. Due to the fact that the autonomous truck 100 has a larger turning radius 220 than the pilot car 200, it does not completely follow the path 210b of the pilot car 200 when the pilot car takes the corner. Thus, the autonomous truck 100 follows a path 2201 deviating from the path 210b of the pilot car 200. Preferably, the pilot car may still be driven in a way corresponding to driving of the autonomous truck with regard to other driving operations, such as acceleration and braking.

Figure 6:
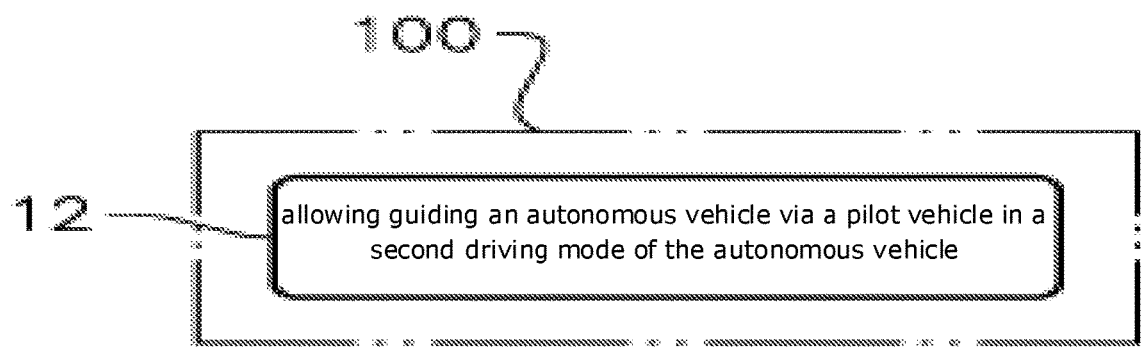
FIG. 6-8 are block diagrams of different embodiment methods.

FIG. 6 is a block diagram of a first embodiment method, showing the step performed by the autonomous vehicle 100. The embodiment comprises the step 12 of allowing guiding the autonomous vehicle 100 via the pilot vehicle 200 in the second driving mode of the autonomous vehicle 100. According to one example, the second driving mode is associated to the second geographic region 20 defined as "not secured for the first type of autonomy", wherein the autonomous truck is not allowed to be driven according to the lint type of autonomy in the second geographic region.

Figure 7A:
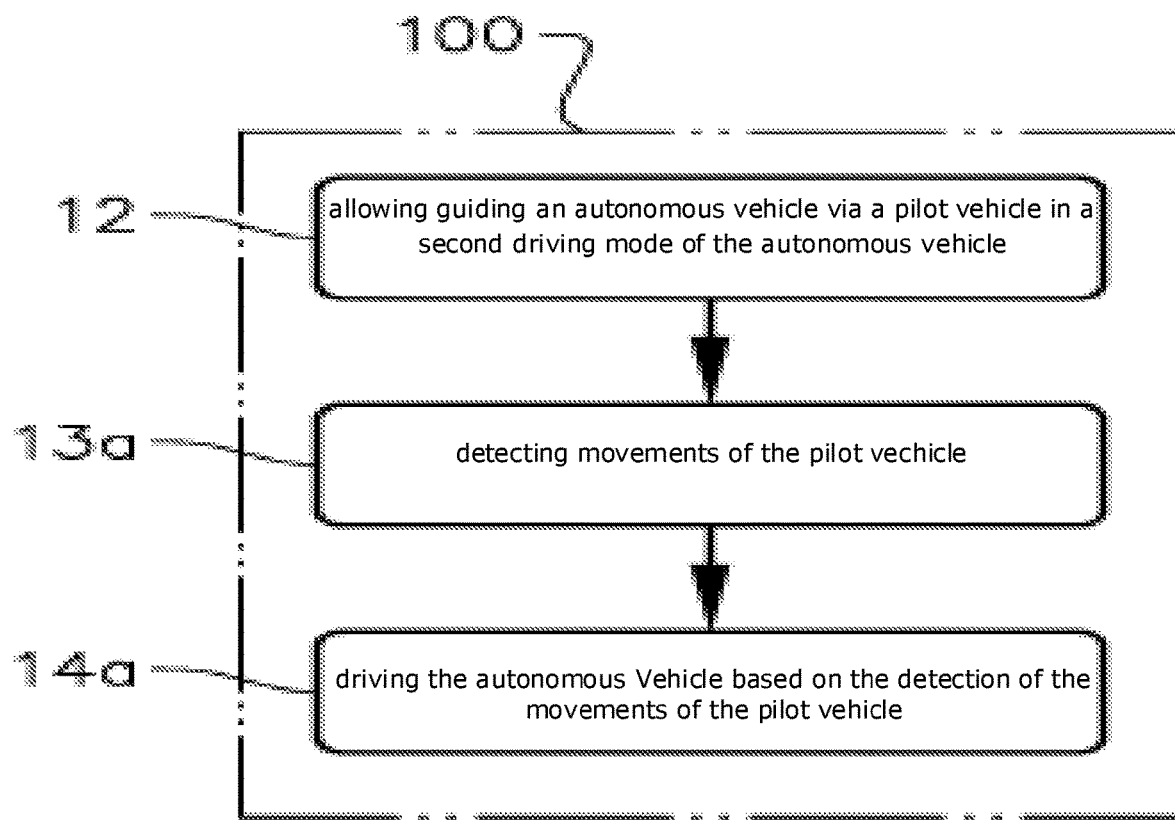

FIG. 7a is a block diagram of a second embodiment method, showing the steps performed by the autonomous vehicle 100. The embodiment comprises in consecutive order the step 12 of allowing guiding the autonomous vehicle via the pilot car 200 in the second driving mode of the autonomous vehicle 100, as above, followed by the step 13a of detecting movements of the pilot car 200, as described above, and the step 14a of driving the autonomous truck 100 based on the detection of the movements of the pilot car 200.

Figure 7B:
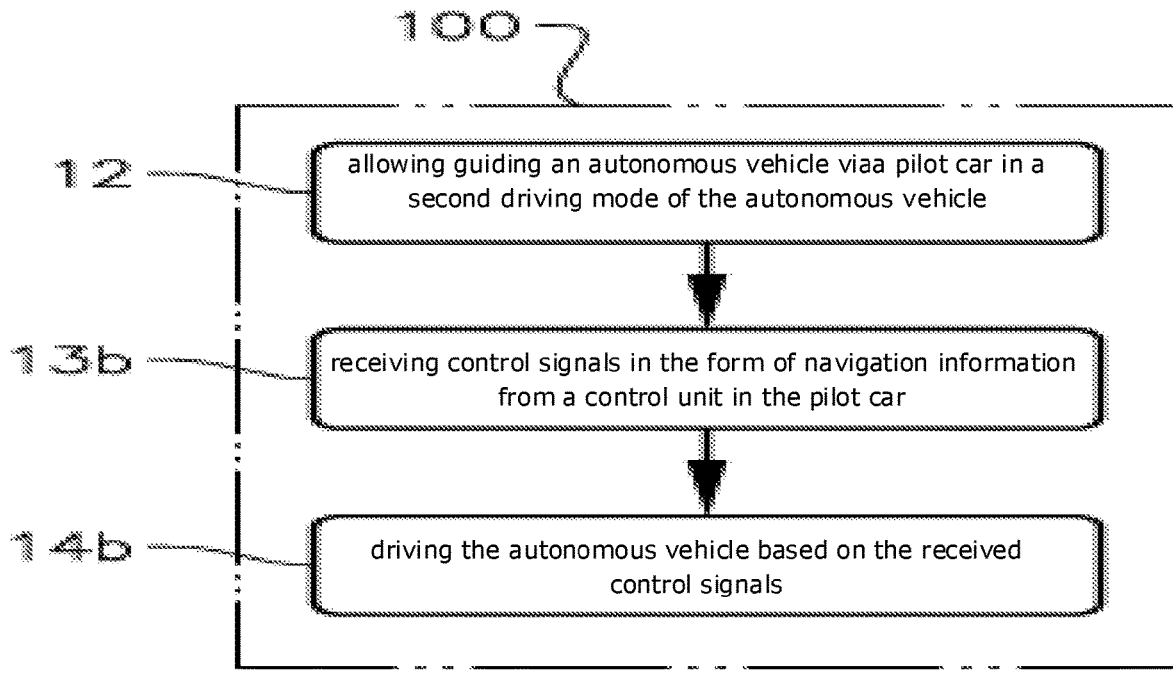

FIG. 7b is a block diagram of a third embodiment method, showing the steps performed by the autonomous vehicle 100. The embodiment comprises in consecutive order the step 12 of allowing guiding the autonomous vehicle via the pilot car 200 in the second driving mode of the autonomous vehicle 100, as above, followed by the step 13b of receiving control signals in the form of navigation information from a control unit 208 in the pilot car 200 and the step 14b of driving the autonomous truck 100 based on the received control signals.

Figure 7C:
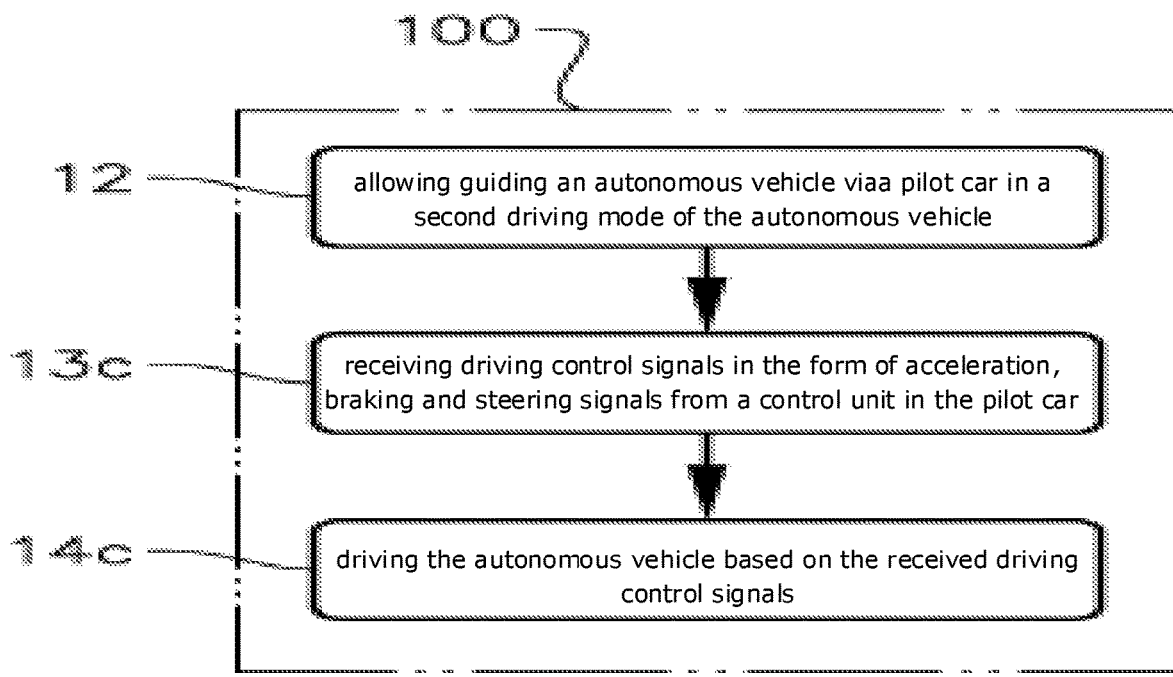

FIG. 7c is a block diagram of a fourth embodiment method, showing the steps performed by the autonomous vehicle 100. The embodiment comprises in consecutive order the step 12 of allowing guiding the autonomous vehicle via the pilot car 200 in the second driving mode of the autonomous vehicle 100, as above, followed by the step 13c of receiving driving control signals in the form of acceleration, braking and steering signals from a control unit 208 in the pilot car 200 and the step 14c of driving the autonomous truck 100 based on the received driving control signals.

Figure 8A:
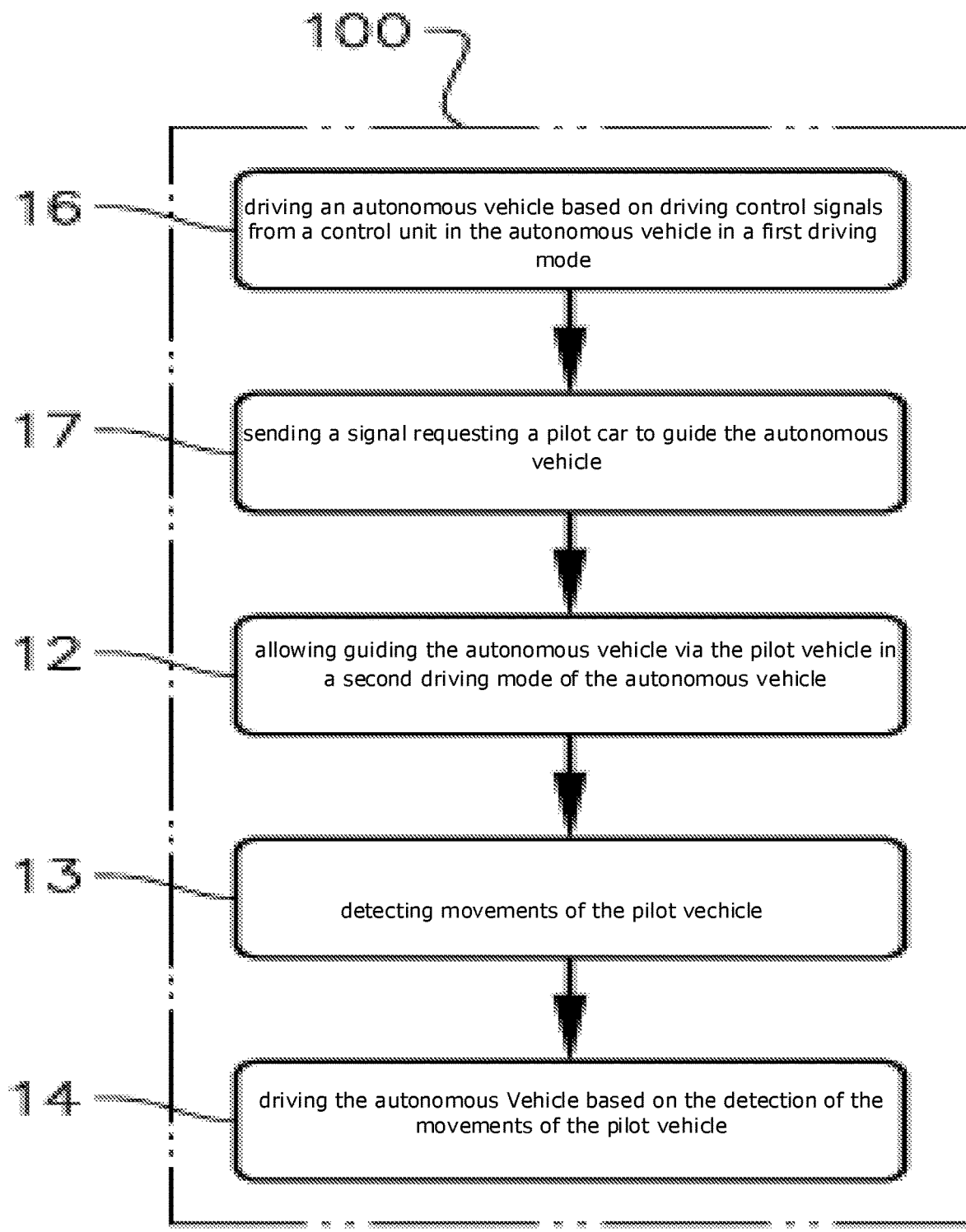

FIG. 8a is a block diagram of a fifth embodiment method, showing the steps performed by the autonomous truck 100 when the autonomous truck 100 travels in the first geographic region 10, approaches and enters the second geographic region 20. The embodiment comprises in consecutive order the step 16 of driving the autonomous vehicle 100 based on driving control signals from a control unit 108 in the autonomous truck in the first driving mode, the step 17 of sending a signal requesting the pilot car 200 to guide the autonomous vehicle and only initiate the guiding of the autonomous truck by the pilot car in the second driving mode after receipt of a confirmation signal from the pilot car in response to the request. Further, the method comprises the consecutive steps 12-14 according to any one of the second, third or fourth embodiment described above.

Figure 8B:
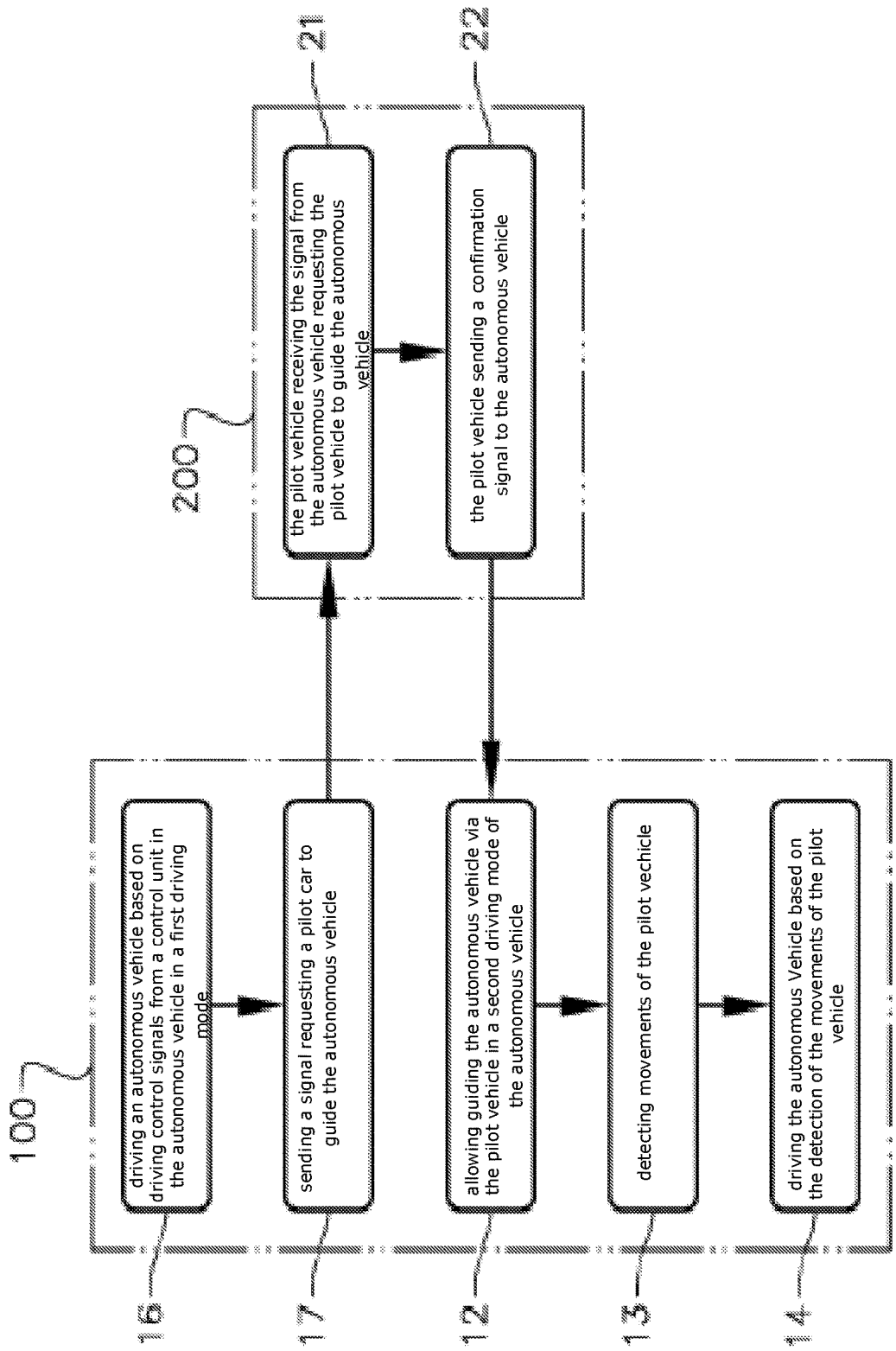

FIG. 8b is a block diagram of a variant of the fifth embodiment method, showing the steps performed by the autonomous vehicle 100 and the pilot vehicle 200. The steps performed by the autonomous vehicle 100 are the same as in FIG. 8a. For ease of presentation, only the steps performed by the pilot vehicle 200 will be explained below. The method comprises the step 21 of the pilot vehicle 200 receiving the signal from the autonomous vehicle 100 requesting the pilot vehicle to guide the autonomous vehicle. The method further comprises the step 22 of the pilot vehicle 200 sending a confirmation signal to the autonomous vehicle 100.

FIG. 8c is a block diagram of a sixth embodiment method, showing the steps performed by the autonomous truck 100 and the pilot car 200 for verifying that the pilot car is the correct lead vehicle. The method comprises the step 26 of the pilot car 200 communicating a predefined identification signal, such as a pattern or similar (signals, such as flashing a light in a certain way, or movements), to the autonomous truck 100. The autonomous truck 100 receives 28 the identification signal and verifies 30 whether it is correct or not. If the pilot car 200 is approved as leader, the method continues with the consecutive steps 12-14 according to any one of the second, third or fourth embodiment described above. The sixth embodiment may of course be combined with the fifth embodiment.

Figure 9:
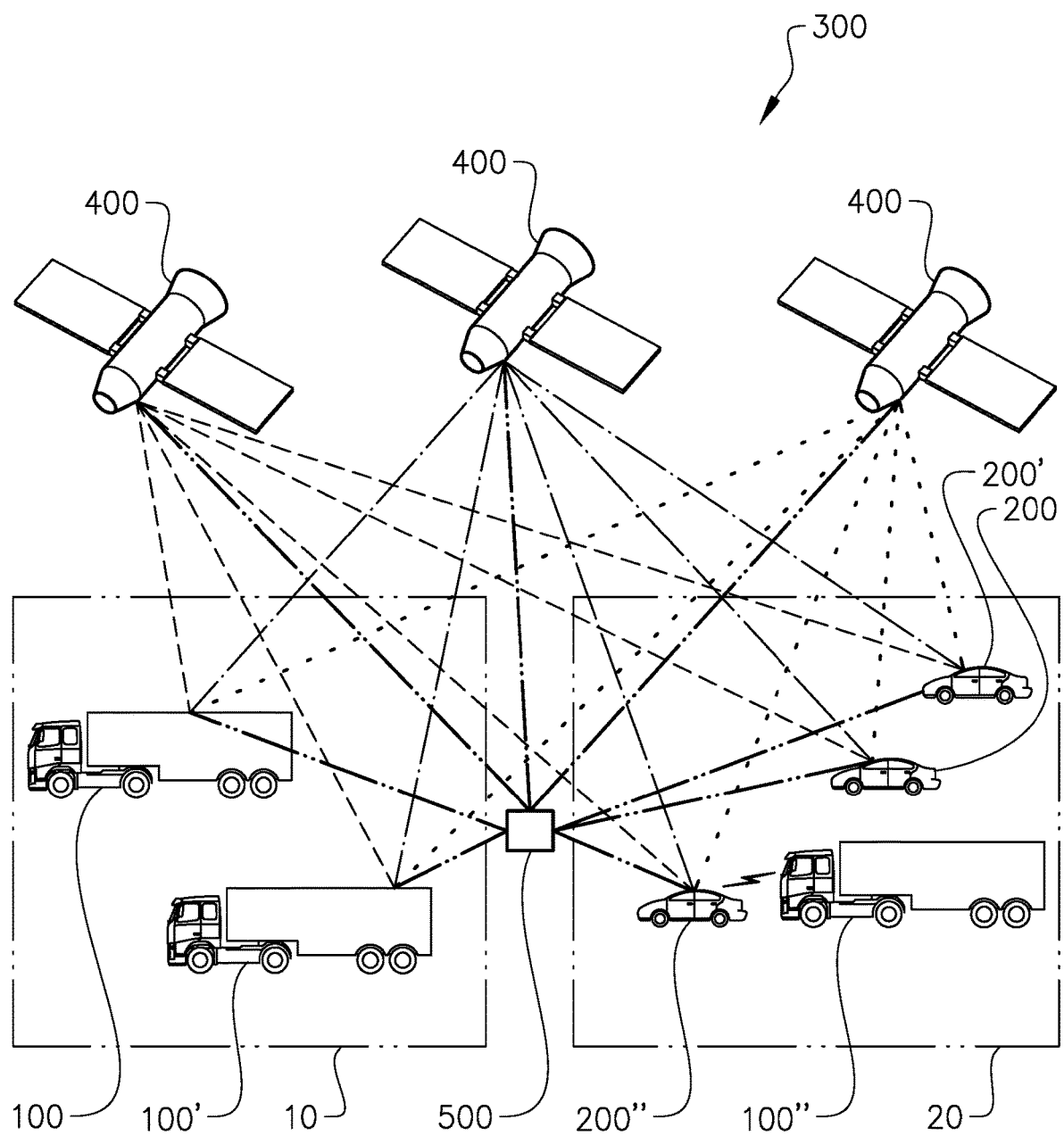
FIG. 9 is a schematic view of a traffic system for monitoring a plurality of autonomous trucks and the pilot cars in different geographic regions defined as "secured for a first type of autonomous driving" and "not secured for the first type of autonomous driving".

FIG. 9 is a schematic view of a traffic system for monitoring a plurality of autonomous trucks and the pilot cars in different geographic regions defined as "secured for autonomy" and "not secured for autonomy". The traffic system comprises a Global Positioning System comprising a plurality of satellites 400. The satellites 400 monitor the position of a plurality of autonomous vehicles 100, 100' in the second geographic region 10 and a plurality of autonomous vehicles 100" and a plurality of pilot vehicles 200, 200' and 200''' in the first geographic region 20. Further, the traffic system comprises a central unit 500, which receives information about the positions of the vehicles from the satellites. Further, the central unit 500 determines the direction of the autonomous vehicles and a time of arrival of each one of the autonomous vehicles at the respective check-in point and check-out point. Further, the central unit 500 is adapted for determining the location and possibly direction of the pilot vehicles checking availability for guiding an autonomous vehicle approaching a check-in point. Further, the central unit 500 is adapted for communicating with the autonomous vehicles and pilot vehicles for pairing a certain autonomous vehicle with a certain pilot vehicle.

It is to be understood that the present invention is not limited to the embodiments described above and illustrated in the drawings; rather, the skilled person will recognize that many changes and modifications may be made within the scope of the appended claims.

According to one application, a plurality of autonomous trucks 100 may be driven in a convoy in the first geographic region 10 (on the highway). Depending on the number of autonomous trucks 100 that is planned to depart, from the first geographic region 10 at a specific check-out point, a corresponding number of pilot cars 200 are requested to meet up at the check out point, wherein each pilot car guides a single, dedicated one of the autonomous trucks 100 to its respective destination within the second geographic region 20.

According to a further application, the autonomous vehicle may instead of a truck be formed by a construction machine, such as a wheel loader or a dumper. The first geographic region may then be a region with limited public access, such as a construction site, for example a mine. The second geographic region may be a public road, which the construction machine needs to travel to or from the construction site, wherein a pilot car is associated to a construction machine for guiding the construction machine in the second geographic region.

The invention claimed is:

1. A vehicle with autonomous driving capability, wherein the autonomous vehicle is adapted for at least two different driving modes comprising a first driving mode configured for a first type of autonomous driving and a second driving mode configured for the autonomous vehicle being guided by a pilot vehicle in such a manner that the autonomous vehicle follows the pilot vehicle, characterized in that the first driving mode is associated to a first geographic region defined as secured for the first type of autonomy, wherein the autonomous vehicle is allowed to be driven in the first type of autonomy in the first geographic region and wherein the second driving mode is associated to a second geographic region defined as not secured for the first type of autonomy, wherein the autonomous vehicle is not allowed to be driven in the first type of autonomy in the second geographic region.

2. A vehicle according to claim 1, wherein the first type of autonomy comprises a fully or substantially fully autonomous driving.

3. A vehicle according to claim 1, wherein the first type of autonomy is adapted for autonomously driving the vehicle towards a destination in response to received driving instructions regarding a route or destination.

4. A vehicle according to claim 1, wherein the first type of autonomy is adapted for autonomously driving the vehicle towards a destination without any pilot vehicle guidance.

5. A vehicle according to claim 1, wherein the second driving mode is configured for a second type of autonomy, which comprises an autonomous following of the pilot vehicle.

6. A vehicle according to claim 1, wherein the autonomous vehicle comprises means for detecting a movement of the pilot vehicle and corresponding to the detected movement driving the autonomous vehicle behind the pilot vehicle.

7. A vehicle according to claim 1, wherein the autonomous vehicle comprises means for detecting an orientation or direction of the pilot vehicle or a distance between the autonomous vehicle and the pilot vehicle.

8. A vehicle according to claim 1, wherein the second driving mode is configured for a non-autonomous driving mode.

9. A vehicle according to claim 1, wherein the first driving mode is configured for driving the autonomous vehicle based on navigation and/or driving control signals generated by a control unit in the autonomous vehicle.

10. A vehicle according to claim 9, wherein the second driving mode is configured for driving the autonomous vehicle based on navigation and/or driving control signals generated by a control unit in the pilot vehicle.

11. A vehicle according to claim 1, wherein the autonomous vehicle comprises means for verifying that a vehicle has the capacity for being the pilot vehicle.

12. A vehicle according to claim 1, wherein the autonomous vehicle is a goods or material transporting vehicle.

13. A vehicle according to claim 1, wherein the autonomous vehicle is a truck.

14. A traffic control system comprising
- at least one vehicle with autonomous driving capability, wherein the autonomous vehicle is adapted for at least two different driving modes comprising a first driving mode configured for a first type of autonomous driving and a second driving mode configured for the autonomous vehicle being guided by a pilot vehicle in such a manner that the autonomous vehicle follows the pilot vehicle,
- at least one pilot vehicle,
- a control means having a processor and a data storage storing thereon a software code the software code causing the processor to perform defining
  - a first geographic region defined as secured for the first type of autonomy, wherein the autonomous vehicle is allowed to be driven in the first type of autonomy in the first geographic region, and
  - a second geographic region defined as not secured for the first type of autonomy, wherein the autonomous vehicle is not allowed to be driven in the first type of autonomy in the second geographic region,
- wherein the pilot vehicle has the capacity to drive in the second geographic region and is allowed to guide the autonomous vehicle in the second geographic region.

* * * * *